June 14, 1955  R. S. MARSDEN, JR., ET AL  2,710,899
RESISTOR UNIT FOR THERMAL NOISE THERMOMETER
Filed May 31, 1951

INVENTORS.
R. S. MARSDEN, JR.
D. R. DE BOISBLANC
BY
*Hudson & Young*
ATTORNEYS

United States Patent Office 2,710,899
Patented June 14, 1955

2,710,899

RESISTOR UNIT FOR THERMAL NOISE THERMOMETER

Ross S. Marsden, Jr., and Deslonde R. de Boisblanc, Bartlesville, Okla., assignors to Phillips Petroleum Company, a corporation of Delaware Application May 31, 1951, Serial No. 229,026

14 Claims. (Cl. 201—63)

This invention relates to a detector which is particularly suitable for use in a thermal noise thermometer.

In a thermal noise thermometer, a pair of impedance or resistance elements are provided, one of which is maintained at a constant known temperature and the other of which is maintained at the temperature to be measured, as by exposure to a flame or hot combustion gases. The resistance or impedance units are selectively connected to an amplifier, the output of which is preferably fed through a squaring circuit to an indicator. After suitable calibration of the amplifier and squaring circuit, as by noting the noise output of the system when connected consecutively to ground and the two test impedances, the temperature to which the second impedance unit is exposed can be determined readily from the thermal noise equation. Such a noise thermometer is disclosed and claimed in our co-pending application, Serial No. 220,115, entitled Thermal Noise Thermometer, filed April 9, 1951.

In such a system, it is very important that the detector, that is, the impedance exposed to the flame or current of gases whose temperature is thereby measured, be protected from ionization effects caused by impingement of the flame or gas current upon the detector. In addition, it is important that the resistance in which the thermal noise is to be measured be maintained throughout at the temperature to be measured.

It is an object of this invention to provide a detector which is uninfluenced by ionization, or other external electrical effects, and in which the impedance subjected to the temperature to be measured is maintained at a constant temperature throughout.

It is a further object to provide a detector which is simple in construction, reliable in operation, and economical to manufacture.

Figure 1:
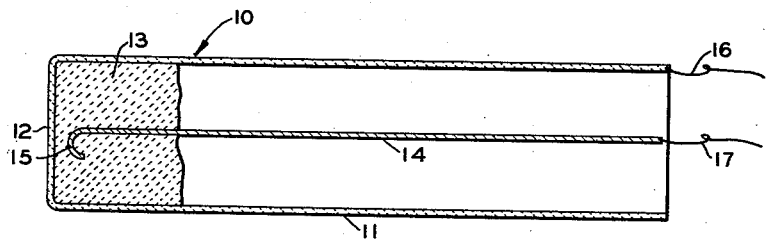
Figure 2:
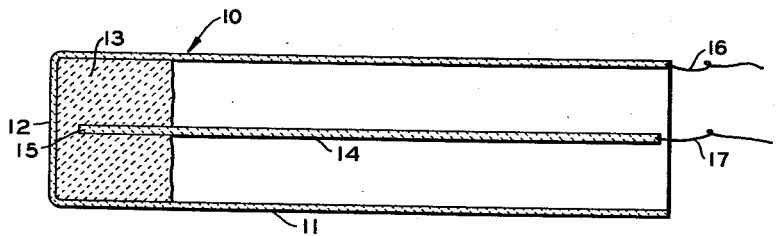

Various other objects, advantages and features of the invention will become apparent from the following detailed description taken in conjunction with the accompanying drawing, in which:

Figure 1 is a vertical sectional view of a detector constructed in accordance with the invention; and Figure 2 is a horizontal sectional view of detector shown in Figure 1.

Referring now to the drawings in detail, the detector comprises a generally cup-shaped shell 10 having a cylindrical barrel 11 together with an integral base portion 12 closing one end of the cylindrical portion. Mounted within the shell and contacting the base 12 is a generally cylindrical insert 13 formed from refractory material. An axial electrode 14 has a hook-shaped inner end 15 which is disposed within the insert 13. Leads 16 and 17 are connected to the outer ends of the shell and electrode, respectively.

We have discovered that greatly improved results are obtained when the ohmic resistance of the insert 13 is substantially greater than that of the shell 11. Under these conditions, when the detector is exposed to a flame or current of hot gases, a thermal noise voltage is generated between electrode 14 and shell 11, and substantially no thermal noise voltage is generated within the shell, since the noise voltage is proportional to the square of the impedance of the shell and insert. The shell, moreover, protects the insert 13 from contact with ions present in the flame or hot gas current, which might result in the production of spurious voltages. Finally, since the insert is located at the tip of the detector in contact with base portion 12, it is subjected uniformly to the high temperature to be measured, since the tip, of course, normally protrudes into the flame or hot gas current further than any other part of the detector. That is, if the shell 11 were formed from high resistance material, a temperature gradient from the tip to the base of the detector would result in the generation of a varying noise voltage which would be lower at the base than at the tip.

We have found that the most suitable materials for use in the shell are the refractory metal carbides, such as silicon carbide, titanium carbide, zirconium carbide, columbium carbide, tantalum carbide, tungsten carbide, and hafnium carbide. Silicon carbide has been found to give outstanding results and is the preferred material for use in the shell. However, other materials can be used provided that the resistance of the shell is less than 10 ohms, and preferably less than 1 ohm, at the temperature range in which the measurements are to be taken. The refractory metal carbides just mentioned all have resistances of the desired value within a temperature range extending from 1000° C. to 2500° C.

The preferred materials for construction of the insert 13 are the refractory metal oxides, such as aluminum oxide, calcium oxide, zirconium oxide, beryllium oxide, thorium oxide, and magnesium oxide, which have moderately high ohmic resistances within the temperature range previously mentioned.

We have found that outstanding results are obtained when aluminum oxide is utilized as the major constituent of the insert. However, other materials may be used, or mixtures of aluminum oxide with small amounts of materials, such as the above named refractory metal carbides, provided that the total resistance of the insert is greater than 500 ohms, and preferably greater than 1000 ohms. It will be further understood, of course, that various types of inert filler materials and other constituents may be utilized with the refractory compounds just discussed. It will be evident, from the foregoing, that the resistance of the insert should be greater than that of the shell by a factor of at least 50 to 1, preferably at least 1000 to 1.

The electrode 14 is advantageously formed from the same material as that of the shell 11, the preferred material being silicon carbide which has a very low resistance at the temperature range under consideration.

When using the detector in combination with the thermal noise thermometer disclosed in our previously-mentioned application, Serial No. 220,115, we have found by actual test that furnace temperatures can be measured with an accuracy of 1 per cent at a temperature of 1500° C. The detector of our invention is also useful as the fixed calibrating resistance in the thermal noise thermometer just mentioned, the shield preventing the pickup of stray electrical disturbances resulting from the making and breaking of electrical contacts in the vicinity of the detector element.

While the invention has been described in connection with a present, preferred embodiment thereof, it is to be understood that this description is illustrative only and is not intended to limit the invention, the scope of which is defined by the appended claims.

We claim:

1. A detector comprising, in combination, a generally cylindrical non-metallic refractory shell having an integral base portion closing one end thereof, a generally cylindrical insert mounted in said shell and formed from non-metallic refractory material, a conductor having a hook-shaped end portion secured within said insert, the resistivity of said insert being substantially greater than the resistivity of said shell, and leads connected to said shell and said conductor, the resistance between said leads being greater than the resistance of said shell by a factor of at least 50 to 1.

2. A detector comprising, in combination, a generally cylindrical non-metallic refractory shell having an integral base portion closing one end thereof, a generally cylindrical insert mounted in said shell and formed from non-metallic refractory material, a conductor having a hook-shaped end portion secured within said insert, and leads connected to said shell and said conductor, the resistance between said leads being greater than 510 ohms, of which resistance that of the shell is less than 10 ohms.

3. A detector comprising, in combination, a generally cylindrical non-metallic refractory shell having an integral base portion closing one end thereof, a generally cylindrical insert mounted in said shell and formed from non-metallic refractory material, a conductor having a hook-shaped end portion secured within said insert, and leads connected to said shell and said conductor, the resistance between said leads and shell being greater than 1000 ohms at temperatures within the range of 1000° C. to 2500° C., of which resistance that of the shell is less than 1 ohm.

4. A detector comprising, in combination, a generally cylindrical shell having an integral base portion closing one end thereof, said shell being formed from a refractory metal carbide, an insert mounted within said shell and engaging said base portions, said insert being formed from a refractory metal oxide, and an electrode extending into said shell and contacting said insert.

5. A detector comprising, in combination, a generally cylindrical shell having an integral base portion closing one end thereof, said shell being formed from a refractory metal carbide, an insert mounted within said shell and engaging said base portions, said insert being formed from a refractory metal oxide, an electrode formed from a refractory metal carbide extending into said shell and contacting said insert.

6. A detector comprising, in combination, a generally cylindrical shell having an integral base portion closing one end thereof, said shell being formed from a refractory metal carbide, an insert mounted within said shell and engaging said base portions, said insert being formed from a refractory metal oxide, an electrode formed from a refractory metal carbide extending into said shell and having a hook-shaped end portion connected to and disposed within said insert.

7. A detector constructed in accordance with claim 5 in which the refractory metal carbide is selected from the group consisting of tungsten carbide, hafnium carbide, titanium carbide, zirconium carbide, columbium carbide, tantalum carbide, and silicon carbide, the refractory metal oxide being selected from the group consisting of aluminum oxide, calcium oxide, zirconium oxide, beryllium oxide, thorium oxide, and magnesium oxide.

8. A detector constructed in accordance with claim 6 in which the refractory metal carbide is selected from the group consisting of tungsten carbide, hafnium carbide, titanium carbide, zirconium carbide, columbium carbide, tantalum carbide, and silicon carbide, the refractory metal oxide being selected from the group consisting of aluminum oxide, calcium oxide, zirconium oxide, beryllium oxide, thorium oxide, and magnesium oxide.

9. A detector constructed in accordance with claim 5 in which the refractory metal carbide is silicon carbide and the refractory metal oxide is aluminum oxide.

10. A detector constructed in accordance with claim 5 in which the refractory metal carbide is tungsten carbide.

11. A detector constructed in accordance with claim 5 in which the refractory metal carbide is hafnium carbide.

12. A detector constructed in accordance with claim 5 in which the refractory metal carbide is titanium carbide.

13. A detector constructed in accordance with claim 5 in which the refractory metal carbide is tantalum carbide.

14. A detector unit comprising, in combination, a generally cup-shaped shell of metallic refractory material, an insert of metallic refractory material fitted within the base of said cup-shaped shell, the electrical resistivity of said insert being substantially higher than the resistivity of said shell, a conductor connected to said insert and extending outwardly from said shell, and leads connected to said conductor and said shell, the electrical resistance between said leads being greater than 510 ohms, of which electrical resistance that of the shell is less than 10 ohms.

References Cited in the file of this patent

UNITED STATES PATENTS

| | | |
|---|---|---|
| 1,823,706 | Staehle | Sept. 15, 1931 |
| 1,913,272 | Graf | June 6, 1933 |

FOREIGN PATENTS

| | | |
|---|---|---|
| 943,364 | France | Oct. 4, 1948 |